INVENTORS P. I. BONYHARD
U. F. GIANOLA
BY Herbert M. Shapiro
ATTORNEY

United States Patent Office 3,453,609

Patented July 1, 1969

3,453,609

MAGNETIC DOMAIN WALL MEMORY HAVING PLURAL WALL POSITIONS PER BIT LOCATION

Peter I. Bonyhard, Newark, and Umberto F. Gianola, Florham Park, N.J., assignors to Bell Telephone Laboratories, Incorporated, Murray Hill, N.J., a corporation of New York Filed Nov. 28, 1966, Ser. No. 597,343
Int. Cl. G11b *5/02, 5/12*
U.S. Cl. 340—174 8 Claims This invention relates to data processing arrangements and, more particularly, to such arrangements including magnetic storage elements.

K. D. Broadbent, Patent 2,919,432, issued Dec. 29, 1959, discloses a magnetic device commonly known as a domain wall shift register. Such a device normally employs a magnetically-initialized magnetic medium in which a reverse magnetized domain is generated in response to a first field in excess of a first threshold in a limited portion of the medium and in which such reverse domains move in response to second fields in excess of a second threshold but less than the first threshold. The second fields are normally generated in consecutive portions of the medium for moving the domains from input to output positions. Reverse domains are bounded from magnetically-initialized portions of the material by what are called domain walls.

R. L. Snyder, Patent 3,214,127, issued Mar. 15, 1966, describes a domain wall word-organized memory wherein a domain wall is stored in each bit location of the memory and controllably moved to first and second positions in each bit location representing a binary one and a binary zero respectively. The movement of the walls is accomplished by generating a "read" field which returns stored walls in each bit location of a selected word from first or second storage positions to a single intermediate position where a first or second polarity digit field is operative to move the wall again to a storage position. In nonselected words, coil means generate fields which retain stored walls in storage positions beyond the range of the digit fields. Such an arrangement is relatively complicated and does not lend itself to memory organizations other than the word organization described.

An object of this invention is a new and novel domain wall memory having, inter alia, the capability of changing the information stored at a single bit location.

The foregoing and further objects of this invention are realized in one embodiment thereof wherein first ("1") and second ("0") storage and corresponding first and second intermediate positions for a domain wall are defined in each bit location of a domain wall wire memory. Oppositely poled word fields are generated concurrently in a bit location between each intermediate and associated storage position for moving a wall from either intermediate position to the corresponding storage position and vice versa depending on whether the applied word pulse generating those fields is of a first or a second polarity. Digit pulses of first and second polarities determine whether the domain wall in a particular bit location is at the first or second intermediate position, respectively, when a word pulse of a first polarity is applied. Readout is carried out conveniently by a word pulse of a second polarity and a digit pulse together. Such an arrangement is particularly suitable for an organization generally known as a 2½ D memory.

A feature of this invention, then, is a magnetic memory including means defining first and second storage and corresponding first and second intermediate positions for a domain wall in each bit location therein and means generating fields concurrently between intermediate and corresponding storage positions in each bit location for selectively moving a domain wall from intermediate to storage positions and vice versa depending on whether the pulse generating those fields is of a first or second polarity.

The foregoing and further objects and features of this invention will be understood more fully from a consideration of the following detailed description rendered in conjunction with the accompanying drawing in which.

Figure 1:
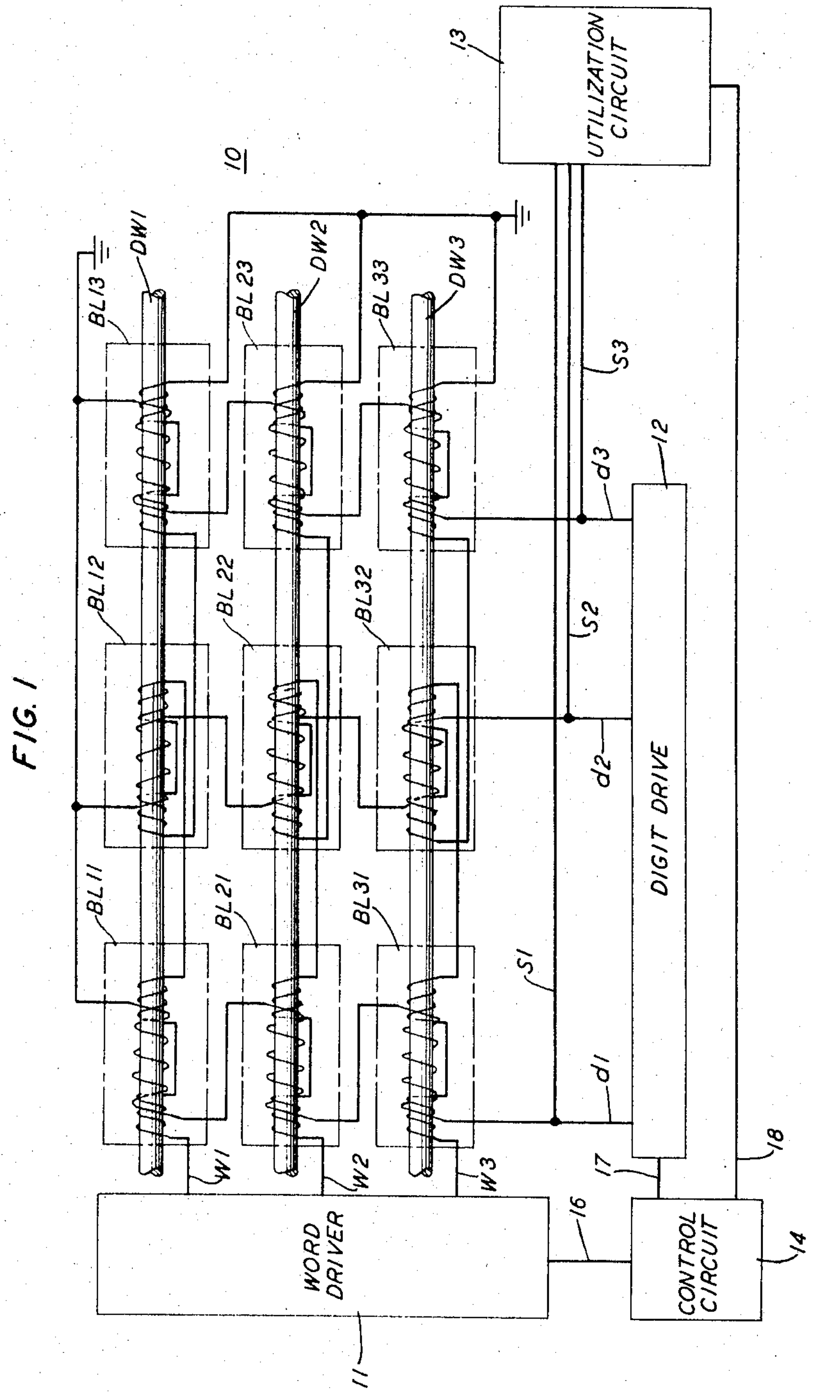
FIG. 1 is a schematic representation of a magnetic memory in accordance with this invention.

FIG. 1 shows a magnetic memory 10 including a plurality of domain wall wires, illustratively three, designated DW1, DW2, and DW3. The domain wall wires are coupled by word conductors W1, W2, and W3, respectively. Let us designate bit locations in the memory by broken blocks BL11, BL12, . . ., and BL33 where the numerals in each designation represent the row and column in which the bit location is positioned. Each word conductor couples a correspondingly designated wire at each of two spaced apart positions in each bit location. In addition, the senses of the two couplings between the word conductor and the wire at each bit location are opposite to one another. Further, the relative senses of the couplings between the word conductor and the wire at one bit location are reversed from the relative senses of the couplings in the next adjacent bit location. This arrangement is clear from FIG. 1. For example, conductor W1 couples bit location BL11 twice at spaced apart positions in a first and second sense as it appears to couple bit location BL12. However, conductor W1 interconnects the couplings at the two bit locations so that the actual sense of the couplings in bit location BL12 is reversed, that is to say, in a second-first sense, as viewed from left to right in FIG. 1, in contradistinction to a first-second sense as is the case in bit location BL11. The word conductors are connected between a word driver 11 and ground.

A plurality of digit conductors, designated *d*1, *d*2, and *d*3, couple the portions of the domain wall wires intermediate the two spaced apart word couplings in each of the bit locations of the first, second, and third columns of bit locations, respectively. The senses of the couplings between digit conductor *d*2 and the domain wall wires at bit locations in the second column are opposite to the senses of the couplings between digit conductors *d*1 and *d*3 and the wires in the bit locations of columns one and three. The senses of the couplings between each digit conductor and the bit locations of the corresponding column are alike. The digit conductors are connected between a digit driver 12 and ground.

Sense conductors S1, S2, and S3 are connected between correspondingly designated digit conductors and a utilization circuit 13.

The word and digit drivers 11 and 12 and the utilization circuit 13 are connected to a control circuit 14 via conductors 16, 17, and 18, respectively. The various drivers and other circuits herein may be any such circuits capable of operating in accordance with this invention.

The couplings between the word conductors and the corresponding domain wall wire and between the digit conductors and the domain wall wires, then, define the bit locations demarcated by the broken blocks designated BL11 . . . BL33 in FIG. 1. Representative bit locations BL11 and BL12 are shown in FIG. 2.

Figure 2:
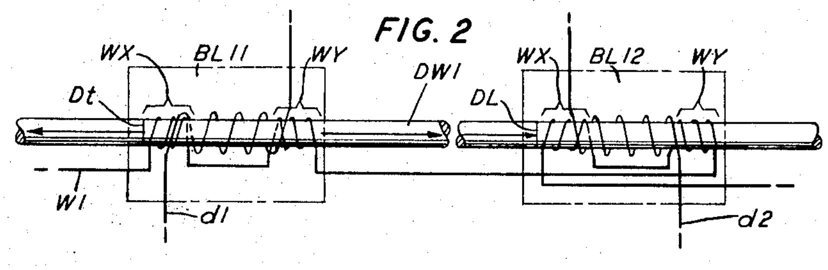
FIGS. 2 through 6 are schematic representations of a portion of the memory of FIG. 1 showing magnetic conditions therein during operation.
Figure 3:
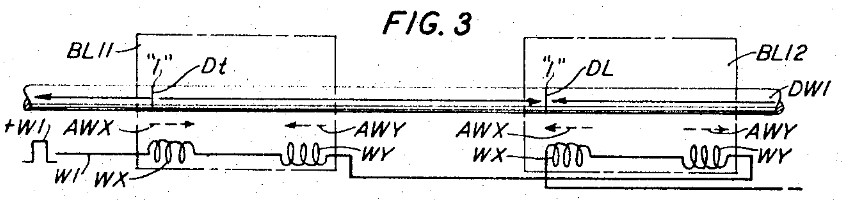

A reverse magnetized domain is stored permanently at each pair of bit locations such that the trailing domain wall thereof lies normally in a position corresponding to the left edge of the coupling of the word conductor W1 in an odd-numbered bit location and the leading domain wall lies normally in a position corresponding to the left edge of the coupling of the word conductor in the next adjacent even-numbered bit location as shown in FIG. 2. This position for the domain wall is designated the "1" (first storage) position for each of bit locations BL11 and BL12 as shown in FIG. 3. We will assume that the magnetic wire is initialized to a magnetic condition represented by an arrow directed to the left as shown in FIG. 3. A reverse magnetized domain then is represented by an arrow directed to the right. The trailing domain wall of the reverse domain is designated D*t* in FIGS. 2 and 3 and can be seen to be in the "1" position in bit location BL11. It is to be recognized that it is the leading wall, designated DL, rather than the trailing wall which so occupies the "1" position in bit location BL12. What is described for the positioning of a trailing domain wall in bit location BL11 applies to the positioning of the leading domain wall in bit location BL12. We must bear in mind, however, that a field of a given polarity moves leading and trailing walls in opposite directions as is well known. The reversal of the senses of the couplings in adjacent bit locations, then, is to effect like movement of walls therein in response to like pulses.

Means providing reverse domains in magnetic wires are well known and not discussed herein. Since such domains, once provided, are intended to remain permanently in the bit locations in accordance with this invention, such domains are assumed present. A description of the means for so providing the domains is considered unnecessary for an understanding of the invention. Any means for providing such domains, initially, suffices.

The word conductor couples the magnetic wire DW1 twice at each bit location as has already been stated. Let us designate the first coupling at each of the representative bit locations BL11 and BL12 as WX, the second as WY, as shown in FIG. 2.

Figure 4:
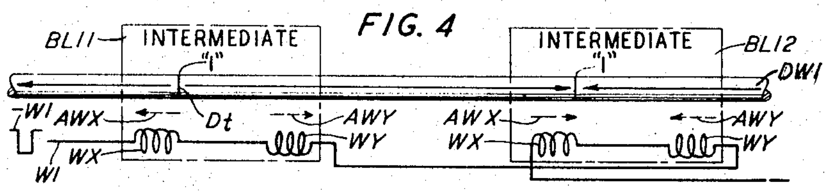
Figure 5:
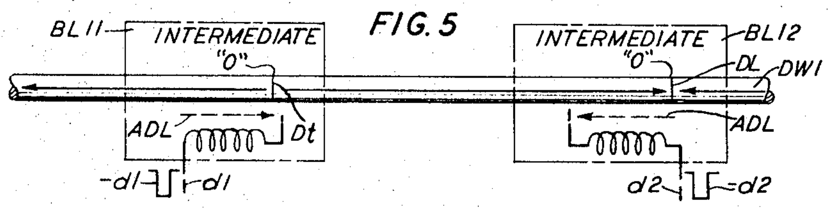
Figure 6:
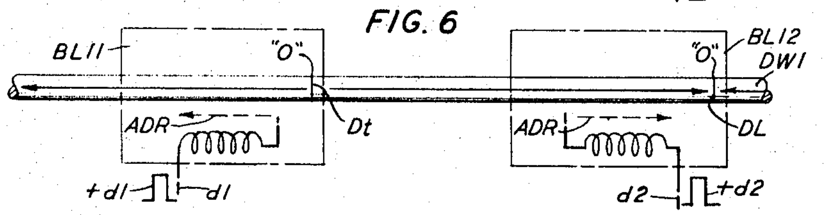

A digit conductor bridges the two couplings between the word conductor and the magnetic wire at each bit location. A first intermediate position at a bit location is defined as the position where the coupling of a digit conductor meets a coupling WX as shown in FIG. 2. This first intermediate position is designated the intermediate "1" position as shown in FIG. 4. Similarly, the second intermediate position is defined by the position where a digit conductor coupling and a word conductor coupling WY meet at a bit location. The second intermediate position is designated the intermediate "0" position as shown in FIG. 5. The right edge of the coupling WY between a word conductor and a magnetic wire, as shown in FIG. 2, defines the second storage position for a domain wall at each bit location. Such a position is designated the "0" position as shown in FIG. 6.

It is to be emphasized that next adjacent bit locations in a word include reversed couplings in the illustrative arrangement. Specifically, if the coupling arrangement in bit location BL11 is first sense-second sense between the word conductor and the magnetic wire, then the coupling arrangement in bit location BL12 is second sense-first sense. This expedient permits the use of a trailing domain wall in one bit location and the corresponding leading domain wall in the next as described. Otherwise, a reverse domain is stored adjacent each bit location such that a like domain wall is moved in each bit location.

The domain walls in the representative bit locations of FIG. 2 are moved in response to word and digit pulses applied to word conductor W1 and to digit conductors *d*1, *d*2, and *d*3. A positive pulse in conductor W1, we will assume, generates fields directed to the right and to the left in bit location BL11 as indicated by the broken arrows, designated AWX and AWY, as shown in FIG. 3. Oppositely directed fields are generated in bit location BL12 in response to the same pulse, of course, as represented by the broken arrows AWX and AWY in the bit location BL12 representation also as shown in FIG. 3. Domain walls at intermediate positions in each bit location move to corresponding storage positions in response as is clear from a comparison between FIGS. 3, 4, 5, and 6. The couplings between conductor W1 and wire DW1 at bit locations BL11 and BL12 are indicated as a coil configuration beneath the wire representation in FIG. 3 for showing the relationship between the couplings and the fields generated. The positive applied pulse is indicated by the pulse form, designated +W1, to the left of conductor W1 as viewed in FIG. 3.

Similarly, a negative pulse on word conductor W1 generates oppositely poled fields in bit locations BL11 and BL12 as shown by the broken arrows AWX and AWY in FIG. 4. Domain walls at storage positions in each bit location move to corresponding intermediate positions as is clear again from a comparison between FIGS. 3, 4, 5, and 6. The negative applied pulse is indicated by the pulse form, designated −W1, to the left of conductor W1 in FIG. 4.

A negative pulse on conductor *d*1 (odd-numbered digit conductors) is assumed to generate a field represented by broken arrow ADL directed to the right in bit location BL11 of FIG. 5. Such a field moves a domain wall (D*t*) to the left from an intermediate "0" position as shown in FIG. 5 to an intermediate "1" position as shown in FIG. 4. Such movement is clear from a comparison between FIGS. 4 and 5. A negative pulse on conductor *d*2 (even-numbered digit conductors) is assumed to generate a field represented by broken arrow ADL directed to the left in bit location BL12 of FIG. 5. Such a field also moves a domain wall (DL) to the left from an intermediate "0" to an intermediate "1" position as is clear again from a comparison between FIGS. 5 and 4.

A positive pulse on conductor *d*1 (odd-numbered digit conductors) generates a field represented by broken arrow ADR directed to the left in bit location BL11 of FIG. 6. Such a field moves a domain wall (D*t*) to the right from an intermediate "1" to an intermediate "0" position as is clear from a comparison between FIGS. 4 and 5 in view of FIG. 6. A positive pulse on conductor *d*2 (even-numbered digit conductors) generates a field represented by broken arrow ADR directed to the right in bit location BL12 of FIG. 6. Such a field moves a domain wall (DL) to the right from an intermediate "1" to an intermediate "0" position again as is clear from a comparison between FIGS. 4 and 5 in view of FIG. 6.

The polarities of the digit pulses generating the associated fields are shown by the positive and negative pulse forms, designated −*d*1, −*d*2, +*d*1, and +*d*2, adjacent conductors *d*1 and *d*2 in FIGS. 5 and 6.

An illustrative operation demonstrates the consistent movement of information in the memory of FIG. 1 as well as the advantages thereof. The operation is discussed in connection with the pulse diagram shown in FIG. 7.

Consider the writing in and reading out of an illustrative word 101 in bit locations BL11, BL12 and BL13 of the memory arrangement of FIG. 1. Operation is initiated by a "read" pulse as will become clear. Specifically, a negative word (read) pulse is applied to conductor W1 at a time $t_0$ in FIG. 7 as represented by the pulse −W1 there. Propagation fields (less than required for generating reverse domains) represented by the broken arrows AWX and AWY as shown in FIG. 4 are generated in bit location BL11 (BL12 and BL13) in response to such a word pulse. All walls coupled by the pulsed word conductor move to corresponding intermediate positions in response to those fields. We will assume that, initially, all walls were in the "1" position and now occupy intermediate "1" positions.

Figure 7:
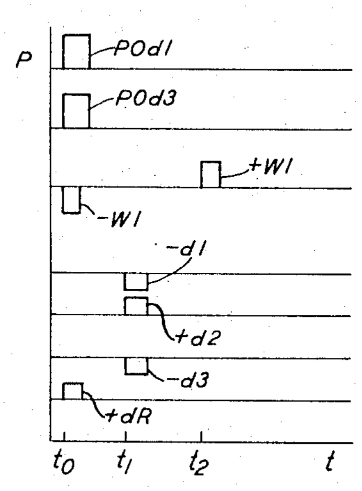
FIG. 7 is a pulse diagram of the operation of the memory of FIG. 1.

Thereafter, at a time $t_1$, negative pulses are applied to conductors *d*1 and *d*3 and a positive pulse is applied to conductor *d*2 as indicated by the pulses −*d*1, +*d*2, and −*d*3 in FIG. 7. A negative digit pulse generates a digit field for moving a domain wall to the left in the coupled portion (of bit locations BL11 and BL13) of the magnetic wire to the intermediate "1" position there as indicated by the broken arrow ADL (directed to the right) as shown in FIG. 5. A positive digit pulse generates a digit field for moving a domain wall to the right in the coupled portion (of bit location BL12), as indicated by the arrow ADR (directed to the left) as shown in FIG. 6, to the intermediate "0" position. The so generated digit fields, then, move a (leading) domain wall only in bit location BL12 to the intermediate "0" position. The (trailing) walls in bit locations BL11 and BL13 are already in intermediate "1" positions to which they are urged by the corresponding digit pulses.

Subsequently, at a time $t_2$ in FIG. 2, a positive word pulse +W1 is applied for generating the fields indicated by the arrows AWX and AWY shown in FIG. 3. The wall bit location BL12 moves to the "0" storage position as shown in FIG. 6. The walls in bit location BL11 and BL13 move to the "1" storage position as shown in FIG. 3. The illustrative word 101 is now stored. It will be noted, however, that the write operation follows a negative word pulse as is indicated by the pulse —W1 shown in FIG. 7 at time $t_0$. In the absence of such a pulse, no domain walls are in intermediate positions to be affected by following digit pulses. Bit locations in nonselected words are not affected by digit pulses then because they do not have walls in intermediate positions when the digit pulses are applied.

So far, the operation is typical of word-organized memories except that (illustratively) no outputs are provided when the negative (word-read) pulse is applied because no walls couple the digit conductors. For a complete word-read operation, not only is a negative word-read pulse applied but, in addition, pulses of a first polarity are provided on all the digit lines (initiated) concurrently with, or, more conveniently, before the word-read pulse thus permitting digit transients to subside before an output pulse is provided. If a positive pulse is applied to all the digit conductors, the domain walls in bit locations BL11 and BL13 move to the right as viewed in FIG. 6 to the intermediate "0" positions, inducing output pulses PO*d*1 and PO*d*3 (FIG. 7) in digit conductors *d*1 and *d*3 which pulses are detected by utilization circuit 13 via sense conductors S1 and S3 under the control of control circuit 14. Bit location BL12 includes a wall in the intermediate "0" position at this time and, consequently, no wall moves and no pulse is generated in sense conductor *d*2 as is clear from FIG. 6. The like digit-read pulses are indicated at time $t_1$ in FIG. 7 as a single representative pulse +*d*R. Bit locations in nonselected words again are not affected by digit-read pulses because they include no walls in intermediate positions.

Information stored in an individual bit location is changed (readout and rewritten) by applying (along with the word-read pulse) a digit-read pulse to only a single digit conductor followed by a digit pulse of the proper (write) polarity on that digit conductor. Information stored in other locations in the so "selected" word moves to corresponding intermediate positions in response to the word-read pulse and is restored to proper storage positions by a next subsequent word-write pulse (see FIG. 7, time $t_2$). It is this read-restore feature along with the use of two intermediate positions which permits the capability of changing a single bit of information.

The memory operates to change a single bit (or selected bits of a word) in response to positive and negative digit pulses and, accordingly, permits scanning for positive and negative pulses when adapted for scanning operations as disclosed in copending application Ser. No. 464,066, filed June 15, 1965, for U. F. Gianola, R. A. Kaenal, and H. E. D. Scovil. In addition, the memory provides a constant back voltage to the digit and word drivers.

All pulses are applied by corresponding drivers under the control of control circuit 14.

Although the invention has been disclosed in terms of a magnetic wire, it is equally possible to implement the described memory organizations, as well, in terms of magnetic sheets such as are disclosed in copending applications Ser. No. 579,995, and Ser. No. 579,931, filed Sept. 16, 1966, for P. C. Michaelis, and for A. H. Bobeck, U. F. Gianola, R. C. Sherwood, and W. Shockley, respectively.

What has been described is considered to be only illustrative of the principles of this invention. Accordingly, various and numerous other arrangements may be devised by one skilled in the art without departing from the spirit and scope of this invention. For example, overlapping sense and digit couplings at each bit location permit readout in a mode different from that described and particularly suited to a word organization.

What is claimed is:

1. A combination including a domain wall propagation medium, means defining in said medium bit locations each including first and second storage and associated first and second intermediate positions for a domain wall, means selectively providing concurrent oppositely poled first and second fields between first storage and first intermediate positions and between second storage and second intermediate positions respectively in each bit location in a first set of bit locations, said fields being adapted for moving a domain wall in each of said bit locations from a storage to a corresponding intermediate position or from an intermediate to a corresponding storage position, and means selectively providing first and second fields between first and second intermediate positions in second sets of bit locations, each of said second sets including a bit location in one of said first sets.

2. A combination in accordance with claim 1 wherein said domain wall propagation medium comprises a magnetic wire.

3. A combination in accordance with claim 2 including means detecting the movement of a domain wall from one intermediate position to another at selected bit locations.

4. A combination including a domain wall propagation medium, means defining in said medium bit locations including first and second storage and first and second intermediate positions for domain walls, bipolar pulse means selectively providing concurrent first and second oppositely poled fields between first storage and first intermediate positions and between second storage and second intermediate positions respectively in each of said bit locations, said fields being adapted for moving domain walls from storage to corresponding intermediate positions and vice versa for filed generating pulses of first and second polarities respectively, and means selectively providing first and second fields between first and second intermediate positions in said bit locations.

5. A combination in accordance with claim 4 wherein said domain wall propagation medium comprises a magnetic wire.

6. A combination in accordance with claim 5 including means detecting the movement of a domain wall from one intermediate position to another at a selected bit location.

7. A magnetic memory including a plurality of domain wall wires, means defining in said wires bit locations each including first and second storage and first and second intermediate positions for a domain wall, first bipolar pulse means selectively providing concurrent oppositely poled first and second fields between first storage and first intermediate positions and between second storage and second intermediate positions respectively in each bit location in a first set of bit locations, said fields being adapted for moving domain walls from said first and second intermediate positions to corresponding storage positions and from first and second storage positions to corresponding intermediate positions for pulses of first and second polarities respectively, second bipolar pulse means selectively providing first and second fields between first and second intermediate positions in each bit location in second sets of bit locations, said last-mentioned fields being adapted for moving domain walls from first to second intermediate positions and from second to first intermediate positions for pulses of first and second polarities respectively, and means detecting the movement of a domain wall from one intermediate position to another at a selected bit location.

8. A combination including a domain wall propagation medium, means defining in said medium bit locations including first and second storage and first and second intermediate positions for domain walls, means providing concurrent first and second fields between first storage and first intermediate positions and between second storage and second intermediate positions respectively in each of said bit locations, said fields being adapted for moving domain walls from first and second storage to corresponding intermediate positions, means providing concurrent first and second fields between second storage and second intermediate positions and between first storage and first intermediate positions respectively in each of said bit locations, said last-mentioned fields being adapted for moving domain walls from first and second intermediate to corresponding storage positions, and means selectively providing first and second fields between first and second intermediate positions in said bit locations.

References Cited

UNITED STATES PATENTS

| | | | |
|---|---|---|---|
| 3,241,127 | 3/1966 | Snyder | 340—174 |
| 3,351,922 | 11/1967 | Snyder | 340—174 |
| 2,919,432 | 12/1959 | Broadbent | 340—174 |

STANLEY M. URYNOWICZ, JR., *Primary Examiner.*